United States Patent
Oey et al.

(10) Patent No.: US 10,592,219 B2
(45) Date of Patent: Mar. 17, 2020

(54) COMPUTER SYSTEM AND METHOD FOR PARALLEL PROGRAM CODE OPTIMIZATION AND DEPLOYMENT

(71) Applicant: Karlsruhe Institute of Technology, Karlsruhe (DE)

(72) Inventors: Oliver Oey, Karlsruhe (DE); Timo Stripf, Karlsruhe (DE); Michael Rückauer, Karlsruhe (DE); Jürgen Becker, Jockgrim (DE)

(73) Assignee: Karlsruhe Institute of Technology, Karlsruhe (DE)

( * ) Notice: Subject to any disclaimer, the term of this patent is extended or adjusted under 35 U.S.C. 154(b) by 0 days.

(21) Appl. No.: 16/108,888

(22) Filed: Aug. 22, 2018

(65) Prior Publication Data
US 2019/0012155 A1   Jan. 10, 2019

Related U.S. Application Data

(63) Continuation of application No. PCT/EP2017/053590, filed on Feb. 17, 2017.

(30) Foreign Application Priority Data

Feb. 22, 2016 (EP) .................................. 16156625

(51) Int. Cl.
*G06F 9/46* (2006.01)
*G06F 9/44* (2018.01)
(Continued)

(52) U.S. Cl.
CPC .............. *G06F 8/456* (2013.01); *G06F 8/443* (2013.01); *G06F 8/451* (2013.01); *G06F 8/453* (2013.01);
(Continued)

(58) Field of Classification Search
CPC .... G06F 9/5088; G06F 9/4881; G06F 9/4494; G06F 9/4862; G06F 8/453; G06F 8/456;
(Continued)

(56) References Cited

U.S. PATENT DOCUMENTS 5,021,947 A * 6/1991 Campbell ............. G06F 9/4494
                                                           712/25
6,263,358 B1 * 7/2001 Lee ......................... G06F 8/458
                                                           718/100
(Continued)

OTHER PUBLICATIONS

Vivek Sarkar, Code optimization of parallel programs: evolutionary vs. revolutionary approaches, Apr. 5-9, 2008, [Retrieved on Nov. 20, 2019]. Retrieved from the internet: <URL: https://dl.acm.org/citation.cfm?id=1356087> 1 pp. 1-1 (Year: 2008).*
(Continued)

*Primary Examiner* — Anibal Rivera
(74) *Attorney, Agent, or Firm* — Brake Hughes Bellermann LLP

(57) ABSTRACT

A compiler system, method and computer program product for optimizing a program is disclosed. The compiler includes an extractor module configured to extract, from an initial program code, a hierarchical task representation wherein each node of the hierarchical task representation corresponds to a potential unit of execution. The root node of the hierarchical task representation represents the entire initial program code and each child node represents a sub-set of units of execution of its respective parent node. It further has a parallelizer module configured to apply to the hierarchical task representation pre-defined parallelization rules associated with the processing device to automatically adjust the hierarchical task representation by assigning particular units of execution to particular processing units of the processing device and by inserting communication and/or synchroni-
(Continued)

zation in that the adjusted hierarchical task representation reflects parallel program code for the processing device.

19 Claims, 9 Drawing Sheets

(51) Int. Cl.
| | |
|---|---|
| *G06F 9/50* | (2006.01) |
| *G06F 17/50* | (2006.01) |
| *G06F 8/41* | (2018.01) |
| *G06F 8/60* | (2018.01) |
| *G06F 9/48* | (2006.01) |
| *G06F 8/72* | (2018.01) |

(52) U.S. Cl.
CPC ............... *G06F 8/458* (2013.01); *G06F 8/60* (2013.01); *G06F 8/427* (2013.01); *G06F 8/72* (2013.01); *G06F 9/4881* (2013.01); *G06F 9/5088* (2013.01)

(58) Field of Classification Search
CPC . G06F 8/443; G06F 8/427; G06F 8/72; G06F 8/70; G06F 17/5054; G06F 9/5033; G06F 9/4884; G06F 9/50; G06F 9/502; G06F 9/449; G06F 9/5038; G06F 9/30065; G06F 8/10; G06F 8/34; G06F 8/20; G06F 8/458; G06F 8/451; G06F 11/3672; G06F 11/3058; G06F 17/5045
See application file for complete search history.

(56) References Cited

U.S. PATENT DOCUMENTS

| | | | | | |
|---|---|---|---|---|---|
| 6,266,805 | B1* | 7/2001 | Nwana | ................... | G06F 9/4862 714/35 |
| 6,289,488 | B1* | 9/2001 | Dave | ..................... | G06F 9/4887 712/28 |
| 6,510,546 | B1* | 1/2003 | Blodget | ............... | G06F 17/5054 716/117 |
| 6,748,589 | B1* | 6/2004 | Johnson | .............. | G06F 9/30065 717/150 |
| 8,533,503 | B2* | 9/2013 | Lippett | ................. | G06F 1/3203 713/320 |
| 8,667,474 | B2* | 3/2014 | Radigan | .................. | G06F 8/456 717/136 |
| 9,858,053 | B2* | 1/2018 | Lethin | ..................... | G06F 8/443 |
| 9,990,186 | B2* | 6/2018 | Absar | ..................... | G06F 8/456 |
| 10,180,674 | B2* | 1/2019 | Yaoita | ................ | G05B 19/0426 |
| 2005/0193359 | A1* | 9/2005 | Gupta | ................. | G06F 17/5045 716/104 |
| 2007/0220294 | A1* | 9/2007 | Lippett | ................. | G06F 1/3203 713/320 |
| 2007/0220525 | A1* | 9/2007 | State | ..................... | G06F 9/4881 718/107 |
| 2007/0234367 | A1* | 10/2007 | Schmitt | ............... | G06F 11/3672 718/104 |
| 2007/0283337 | A1* | 12/2007 | Kasahara | ................ | G06F 8/456 717/149 |
| 2010/0218196 | A1* | 8/2010 | Leung | ..................... | G06F 8/453 718/107 |
| 2010/0275213 | A1* | 10/2010 | Sakai | .................... | G06F 9/5033 718/104 |
| 2010/0299657 | A1* | 11/2010 | Barua | ..................... | G06F 8/456 717/136 |
| 2010/0325608 | A1* | 12/2010 | Radigan | .................. | G06F 8/456 717/106 |
| 2011/0047554 | A1* | 2/2011 | Lakshmanan | ......... | G06F 9/5088 718/105 |
| 2011/0047555 | A1* | 2/2011 | Lakshmanan | ......... | G06F 9/5088 718/105 |
| 2011/0078426 | A1* | 3/2011 | Stoitsev | .................... | G06F 8/10 712/244 |
| 2011/0088021 | A1* | 4/2011 | Kruglick | ................ | G06F 8/443 717/149 |
| 2011/0099550 | A1* | 4/2011 | Shafi | ................... | G06F 11/3058 718/102 |
| 2011/0209119 | A1* | 8/2011 | Duesterwald | ............ | G06F 8/72 717/122 |
| 2011/0209153 | A1* | 8/2011 | Suzuki | .................. | G06F 9/5038 718/102 |
| 2012/0030646 | A1* | 2/2012 | Ravindran | ................ | G06F 8/34 717/105 |
| 2012/0254551 | A1* | 10/2012 | Kasahara | .................. | G06F 8/70 711/143 |
| 2013/0031536 | A1* | 1/2013 | De | .......................... | G06F 8/427 717/146 |
| 2014/0040855 | A1* | 2/2014 | Wang | ........................ | G06F 8/34 717/107 |
| 2014/0089935 | A1* | 3/2014 | Takano | ..................... | G06F 9/50 718/104 |
| 2014/0304490 | A1* | 10/2014 | Toyama | .................. | G06F 8/451 712/30 |
| 2014/0304491 | A1* | 10/2014 | Kasahara | ................ | G06F 13/28 712/42 |
| 2017/0068234 | A1* | 3/2017 | Yaoita | ................ | G05B 19/0426 |

OTHER PUBLICATIONS

Ashay Rane et al., Enhancing performance optimization of multicore chips and multichip nodes with data structure metrics, Sep. 19-23, 2012, [Retrieved on Nov. 20, 2019]. Retrieved from the internet: <URL: https://dl.acm.org/citation.cfm?id=2370838> 9 pp. 147-156 (Year: 2012).*

C. Polychronopoulos: "Proceedings of the 5th international conference on Supercomputing (ICS '91)," Edward S. Davidson and Friedel Hossfield (Eds.), ACM, New York, NY, USA, 1991, pp. 252-263.

V. Adve et al.: "Advanced Code Generation for High Performance Fortran," in Compiler Optimizations for Scalable Parallel Systems, Pande, S. and D.P. Agrawal (eds.), Springer, Berlin, Heidelberg, 2001, 43 pages.

G. Goulas et al.: "Coarse-grain Optimization and Code Generation for Embedded Multicore Systems," in Proceedings of 16th Euromicro Conference of Digital System Design, IEEE, Sep. 4, 2013, pp. 379-386.

M. Girkar et al.: "The hierarchical task graph as a universal intermediate representation" in International Journal of Parallel Programming, vol. 22, Issue 5, Oct. 1994, pp. 519-551.

T. Stripf et al.: "Compiling Scilab to High Performance Embedded Multicore Systems," Microprocessors and Microsystems, vol. 37, No. 8, Nov. 1, 2013, pp. 1033-1049.

C. R. Calidonna et al.: "A Graphic Parallelizing Environment for User-Compiler Interaction," Proceedings of the 13th International Conference on Supercomputing, ICS '99, Jan. 1, 1999, pp. 238-245.

P. Kulkarni et al.: "Vista: VPO Interactive System for Tuning Applications," ACM Transactions on Embedded Computing Systems, vol. 5, No. 4, Nov. 1, 2006, pp. 819-863.

International Search Report and Written Opinion from International Application No. PCT/EP2017/053590 dated Apr. 4, 2017.

* cited by examiner

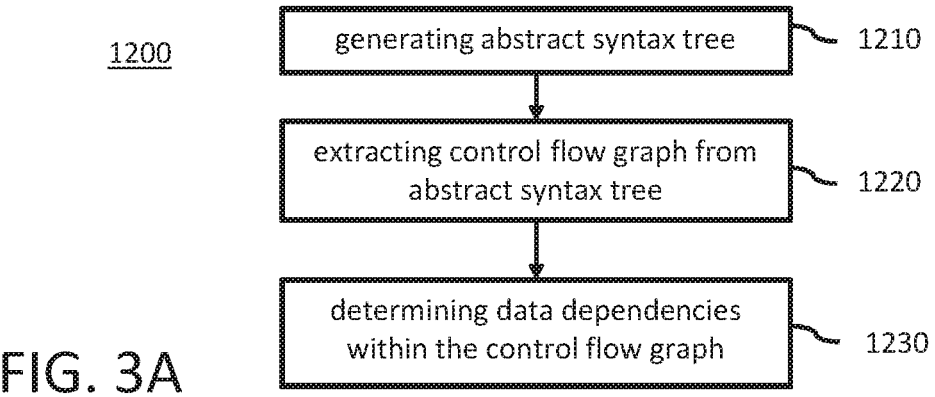
FIG. 3A
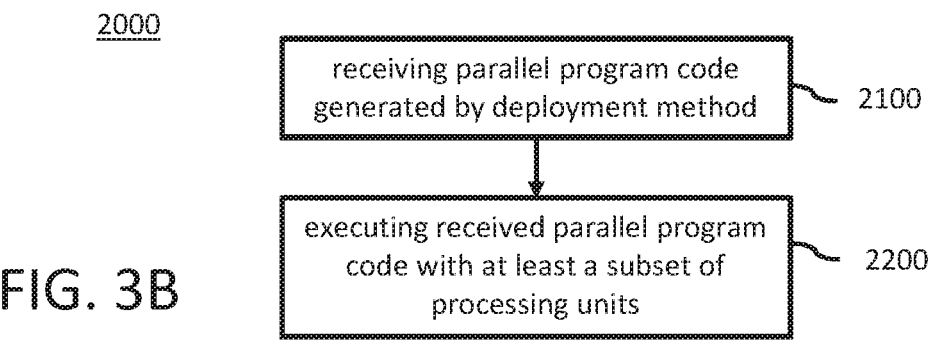
FIG. 3B
111i
```
int main() {
  double in[256][2];
  double out[256][2];
  read_data(in);
  fft(out, in);
  write_data(out);
}
```
FIG. 4

COMPUTER SYSTEM AND METHOD FOR PARALLEL PROGRAM CODE OPTIMIZATION AND DEPLOYMENT

CROSS REFERENCE TO RELATED APPLICATION

This application claims priority to, and is a continuation of PCT Application No. PCT/EP2017/053590, filed on Feb. 17, 2017, entitled "COMPUTER SYSTEM AND METHOD FOR PARALLEL PROGRAM CODE OPTIMIZATION AND DEPLOYMENT," which, in turn, claims the benefit of priority based on EP Application No. EP16156625.2, filed on Feb. 22, 2016, entitled "COMPUTER SYSTEM AND METHOD FOR PARALLEL PROGRAM CODE OPTIMIZATION AND DEPLOYMENT," both of which are hereby incorporated by reference.

TECHNICAL FIELD

The present disclosure generally relates to processing devices, and more particularly, relates to methods, computer program products and systems for optimizing parallel program execution.

BACKGROUND

Parallel processing devices are often used to speed up large computing tasks by splitting the tasks into portions (processes) which can be handled by different data processing units being able to communicate with each other. The different data processing units can then work in parallel on a computing task. The data processing units are often also referred to as central processing units (CPUs) or cores whereas several cores may be included in one CPU. That is, a processing device is a computer system which typically has two or more CPUs/cores to which different processes can be assigned for execution. In the following, such a data processing unit (e.g., a CPU in a plurality of CPUs, or a core in a plurality of cores in a CPU) is referred to as a processing unit.

Typically, an algorithm is developed in applications such as, for example, MATLAB or SCILAB. An algorithm within the context of this disclosure is a self-contained step-by-step set of operations to be performed by a processing device (as a whole). In a later stage, the program code implementing the algorithm may be adapted to be executed by multi-processing-unit systems (i.e., one or more processing devices with a plurality of data processing units). For example, in case of embedded systems the code needs to be generated before it can be deployed to and executed by processing units of the embedded system. There exist automatic solutions for such a parallelization of software code. However, a fully automatic parallelization may not lead to an optimized parallel code program for a given multi-processing-unit processing device. In general, the problem space may be too large to compute all parallelization options in a time interval so that the effect of changes in the original code on the parallelization can be evaluated in a reasonable manner. Typically, automatic parallelization algorithms use heuristics which can achieve good results in a relatively short computation time interval. However, it may be possible that not all optimization options can be computed during this time interval based on the heuristics.

SUMMARY

There is a need for system, method and corresponding program to optimize a computer program at compile time for optimal execution on one or more processing devices having a plurality of processing units and to deploy the resulting parallel program code to the respective processing device(s). A processing unit as used hereinafter can be a processor core (i.e., a core of a multi-core processor), a digital signal processor, a graphical processing unit, or a field programmable gate array (i.e., by using high-level synthesis to deploy the corresponding portion of the parallel code). The technical problem is solved by the system, methods and corresponding program as claimed in the claims. Thereby, the computer-implemented method is a software deployment method which generates and deploys parallelized code to a parallel processing device (e.g., an embedded device). Deployment within the context of this disclosure includes the provisioning of software code from one entity to another entity. The deployment method is thus to be understood as a production step when fabricating such a parallel processing device. Further, the deployment method includes iterative steps for optimizing the parallel code under the constraints of the processing device. During the various iterations the expected performance outcome of the parallel code is computed for the processing units of the parallel processing device. In this context, the iterative optimization of the parallel code includes a simulation method as a modern technical method which forms an essential part of the fabrication process of the processing device and precedes its actual production as an intermediate step.

A compiler within the meaning of this disclosure does not necessarily need to provide byte code. In fact, any transformation of program code into another program code is included in the term "compiling" as used throughout this document. The claimed embodiments allow avoiding disadvantages of a fully automated parallelization. For example, in the case of embedded systems there is only a limited memory size available and such systems typically require time-critical reaction at runtime. Often, embedded systems are used for processing real-time applications in larger systems which require real-time responses in particular situations. Furthermore, redeploying software to embedded systems can be very complicated as they are typically components of larger systems which are not easily accessible via external interfaces. Therefore, there is a need to generate resource efficient programs where the resource consumption is predictable and system administrational efforts at runtime are reduced and, at the same time, execution time of the programs is reduced to an achievable minimum. The solution discloses a semi-automatic compile method for parallel program code where the compile system receives additional constraints and/or parallelization inputs via an interactive user interface.

In some embodiments, a compiler system is provided for optimizing a program for execution by a processing device having a plurality of processing units. The compiler system includes an extractor module configured to extract a hierarchical task representation from an initial program code. In some embodiments, the hierarchical task representation can be a hierarchical task graph Thereby, each node of the hierarchical task representation corresponds to a potential unit of execution (task) wherein the root node of the hierarchical task representation represents the entire initial program code and each child node represents a sub-set of units of execution of its respective parent node. The extraction of the hierarchical representation from the initial program code may be achieved by generating an abstract syntax tree from the syntax of the initial program code; extracting a control flow graph from the abstract syntax tree; and determining data dependencies within the control flow graph. For example, the Open Source GeCoS—Generic Compiler Suite may be used for extracting the hierarchical task representation or hierarchical task graph.

For example, in a hierarchy where the root node is at the bottom of a tree structure, a hierarchy level above the root node level may correspond to a loop structure, a function, a compound statement or a branch statement in the initial program code. For example, the initial program code may be a sequential program code. In some operating systems, a task is synonymous with a process and in others with a thread. In batch processing computer systems, a task is a unit of execution within a job. For example, the initial program code may be a C language program code as disclosed in C standard "ISO/IEC 9899—Programming languages—C". In the C programming language, a loop structure corresponds to a for, while or do-while statement, a compound statement is described in the C standard and a branch statement corresponds to an if, else, or switch statement.

Further, the compiler system has a parallelizer module configured to apply pre-defined parallelization rules to the hierarchical task representation. The pre-defined parallelization rules are associated with the processing device to automatically adjust the hierarchical task representation by assigning particular units of execution to particular processing units of the processing device. Further, appropriate communication and/or synchronization is inserted. Communication instructions for data that is needed on different processors are inserted automatically to ensure that all processing units always have access to the correct version of the data. For example, communication instructions can correspond to send and receive instructions. Furthermore, synchronization instructions are inserted automatically to ensure that the program is executed in the correct order. For example, synchronization instructions can correspond to semaphore or mutex constructs in shared memory systems or to communication instructions in distributed memory systems. The adjusted hierarchical task representation reflects parallel program code for the processing device. That is, the pre-defined parallelization rules take into account the hardware constraints of the processing device with regards to its parallel processing capability, such as for example, the number of processing units, the available memory, the clock speed of the processing units, etc. The parallelizer applies the pre-defined parallelization rules to identify portions of the hierarchical task representation which can be parallelized and takes decisions regarding the assignment of particular portions to particular processing units. Further, it takes decisions where communication and synchronization need to be inserted to handle data dependencies in the program.

Further, the compiler system has a visualizer module configured to generate a visual representation (also referred to as visualization) of the adjusted (parallelized) hierarchical task representation wherein each node is represented by a user interface object and the user interface objects are arranged according to the respective parent-child relationships. In other words, each node (task) of the hierarchical task representation is represented by a graphical object on a display device (e.g., monitor, touchscreen, etc.) to a user. The arrangement of the graphical objects on the display device reflects the hierarchy structure of tasks inherent to the initial program code. The visual representation may also include a scheduling view where a subset of the graphical objects is assigned to the processing units on which the corresponding program portions are to be executed. Typically not all user interface objects are assigned to processing units. Also the subset of user interface objects does not need to include all objects which are assigned to respective processing units. In the scheduling view, the graphical objects are arranged according to their sequence of execution on the respective processing units. Communications between different processing units can also be visualized in a scheduling view.

One or more (or all) of the user interface objects are interactive user interface objects which allow the user to interact with the compiler system. For example, interactive user interface objects may have a specific display property (e.g., a particular color, a particular animation like blinking, etc.) to prompt the user for interacting. The one or more interactive user interface objects are configured to receive one or more user defined parallelization parameters. For example, a user may select an interactive user interface object (e.g., by clicking on the object) and receive options for parallelization parameters that can be selected for parallelization. In the scheduling view, the user may also move, group or link interactive user interface objects as disclosed in the detailed description. Standard user interface functionality may be used for prompting the user with options (e.g., drop down lists, context menus, etc.) and for receiving the user's selection (e.g., click on selected option, drag and drop, etc.). Selection options for parallelization parameters may include: a selection of a particular algorithm for a particular task object represented by the corresponding user interface object, a selection of a particular transformation to improve parallelization of a particular task object, an assignment of a particular task object to a particular processing unit, a scheduling of a particular task object for a particular processing unit, and input about when a first processing unit communicates and synchronizes with a second processing unit. Any such parallelization parameter may be received by the parallelizer as a constraint or a fixed input parameter when performing a further automatic parallelization run by re-applying the pre-defined parallelization rules with the one or more user defined parallelization parameters.

A code generator module can automatically generate a modified parallel program code for the processing device based on the adjusted hierarchical task representation. The modified parallel program code is thereby adjusted to the user-defined parallelization parameters. That is, the user input (user defined parallelization parameters) assists the parallelizer to improve the parallel program code for optimal execution performance on the processing device in a way which goes beyond the optimization capabilities of the parallelizer as defined in the predefined parallelization rules. In some embodiments, the code generator is an integral part of the parallelizer module.

In some embodiments, interactive user interface objects may have a processing unit assignment property indicating a particular processing unit on which the corresponding unit of execution is to be executed by the processing device. For example, the assignment property may be a specific text, logo, color, etc. for each processing unit. In the scheduling view the assignment property is an integral part of the object location (e.g., arranged in a row which corresponds to the corresponding processing unit). Advantageously, interactive user interface objects which correspond to leaf nodes of the hierarchical task representation have such processing unit assignment property. In some embodiments, interactive user interface objects may have a task length property representing the execution time interval of the corresponding unit of execution on a particular processing unit of the processing device. For example, the task length property can be reflected by the size/length of the respective interactive user interface object. In some embodiments, interactive user interface objects may have a task identification property indicating a corresponding code position of the initial program code.

The compiler system can support the user to iteratively optimize the parallel program code by repeating the visualization of the adjusted hierarchical task representation corresponding to the modified parallel program code, receiving more user defined parallelization parameters in response to the repeated visualization, and re-applying the pre-defined parallelization rules to the previously already modified parallel program code. Such steps may be iteratively repeated until the modified parallel program code is optimized for execution on the processing device. Each iteration may result in a visualization of the hierarchical task representation which opens new insights into further parallelization options which are neither discoverable by the automated parallelization algorithm based on the pre-defined parallelization rules nor apparent to the user based on an earlier iteration result. Therefore, the disclosed compiler system allows to iteratively optimizing the parallel program code for execution on said processing device to a degree which cannot be achieved by the existing fully automatic parallelization tools within a reasonable time interval. A fully automatic parallelization run covering the entire problem space for a fully optimized parallelization result may take a plurality of days for less complex programs and may take up to weeks, years or even hundreds or thousands of years for more complex programs when using current state of the art computing hardware. Thereby the complexity of a program increases with the number of its structural elements (e.g., functions, branch statements, loops, compound statements, etc.). It is to be noted that the computation time for a fully automatic parallelization to reach an optimal parallelization result (e.g., a best achievable runtime performance) increases exponentially with the complexity of the program. In the disclosed iterative parallelization approach the automatic parallelization runs are performed for a particular setting of parallelization parameters which are received via the interactive user interface objects. Such parameter settings reduce the problem space to such an extent that the iterative automatic parallelization runs are performed by the parallelizer within several seconds rather than minutes for less complex programs. For very complex programs having many structural layers (hierarchy layers) the computation time for one iteration still does not exceed a few days compared to weeks or even years for a fully automatic parallelization. The iterative approach further enables a user to discover optimization options which would not be apparent without the iterative automatic parallelization runs with a given set of parallelization parameters.

In some embodiments, the compiler system is configured to deploy the modified parallel program code to the processing device. For example, the processing device may be a part of an embedded system where both, the compiler system and the embedded system, are communicatively coupled via corresponding interfaces to allow the exchange of program data. That is, the compiler system provides the parallel code which is then deployed to the embedded system. The processing device has a memory portion to store the received parallel program code which can then be executed on the plurality of processing units. It is not necessary that all available processing units are used by the processing device to execute the parallel program.

In some embodiments, a computer-implemented method is provided for deploying a parallelized program to a processing device with a plurality of processing units. The method includes receiving an initial program code wherein the initial program code implements an algorithm which is to be executed by the processing device; extracting, from the initial program code, a hierarchical task representation wherein each node of the hierarchical task representation corresponds to a potential unit of execution, wherein the root node of the hierarchical task representation represents the entire initial program code and each child node represents a sub-set of units of execution of its respective parent node; applying to the hierarchical task representation pre-defined parallelization rules associated with the processing device to automatically adjust the hierarchical task representation by assigning particular units of execution to particular processing units of the processing device and by inserting communication and/or synchronization in that the adjusted hierarchical task representation reflects parallel program code for the processing device; generating a visual representation of the adjusted hierarchical task representation wherein each node is represented by an interactive user interface object and the user interface objects are arranged according to the respective parent-child relationships; receiving, for one or more interactive user interface objects, one or more user defined parallelization parameters; re-applying the pre-defined parallelization rules with the one or more user defined parallelization parameters to automatically generate a modified parallel program code for the processing device adjusted to the user defined parallelization parameters; and deploying the modified parallel program code to the processing device.

In some embodiments a computer program product is provided including computer-readable instructions that, when loaded into a memory of a computing device (compiler system) and executed by at least one processor of the computing device, cause the compiler system to perform the steps of said computer-implemented method.

In a further embodiment, a further method is provided for executing parallel program code by the processing device with the plurality of processing units. The further method includes the steps of: receiving the parallel program code from a software deployment system (e.g., compiler system), wherein the deployment is performed according to the previously disclosed method as performed by the compiler system; and executing the received parallel program code with at least a subset of the processing units.

Further aspects of the invention will be realized and attained by means of the elements and combinations particularly depicted in the appended claims. It is to be understood that both, the foregoing general description and the following detailed description are exemplary and explanatory only and are not restrictive of the embodiments as described.

BRIEF DESCRIPTION OF THE DRAWINGS

FIG. 3A is a simplified flow chart with sub-steps of one of the steps of said computer-implemented method according to embodiments described herein.

FIG. 3B is a simplified flow chart of a computer-implemented method for executing the deployed parallelized program by a processing device with a plurality of processing units according to an example embodiment.

FIG. 4 is an example of an initial program code.

DETAILED DESCRIPTION

Figure 1:
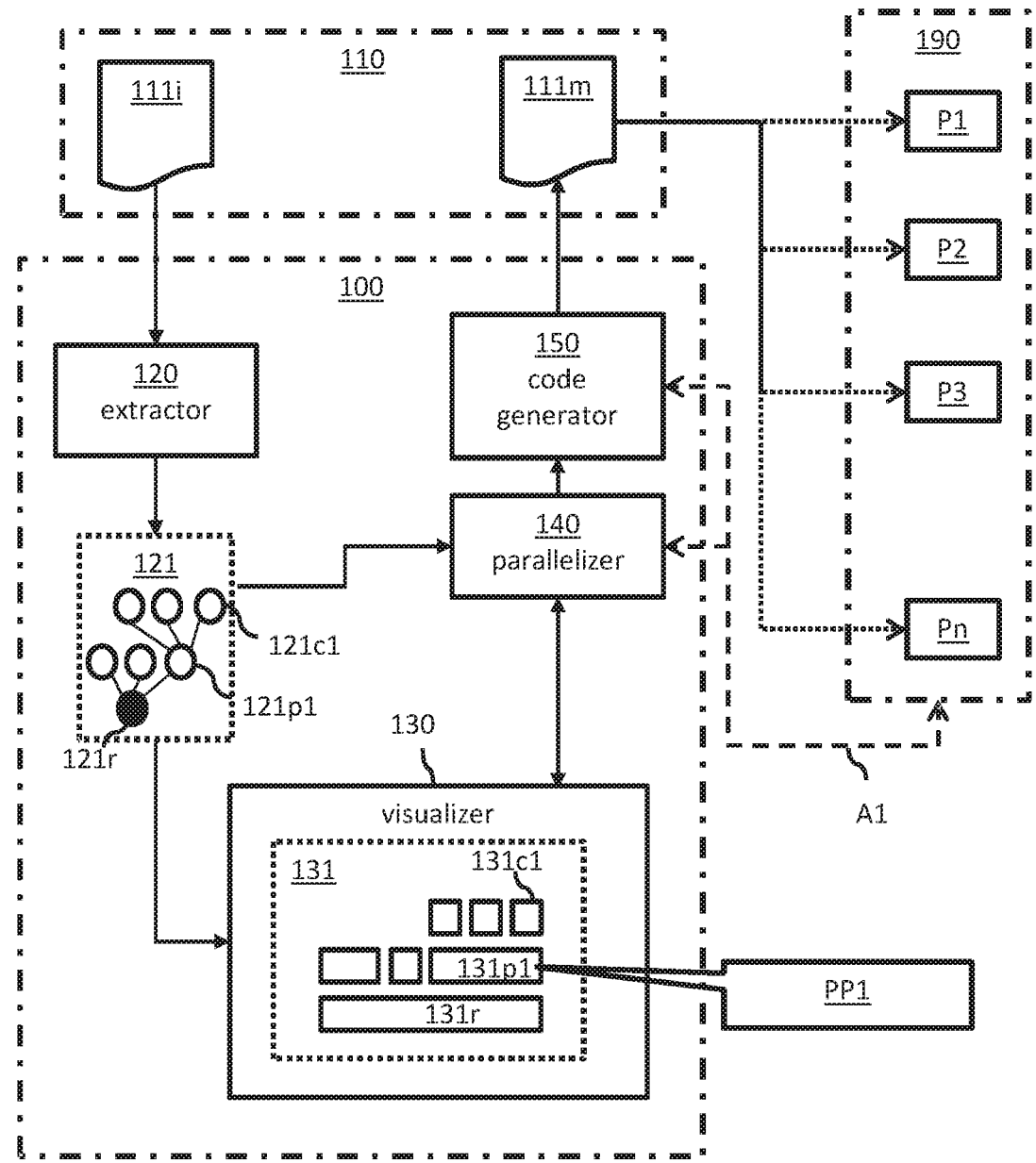
FIG. 1 is a simplified block diagram of a computer system including a compiler system for optimizing and deploying a program for processing device execution.
Figure 2:
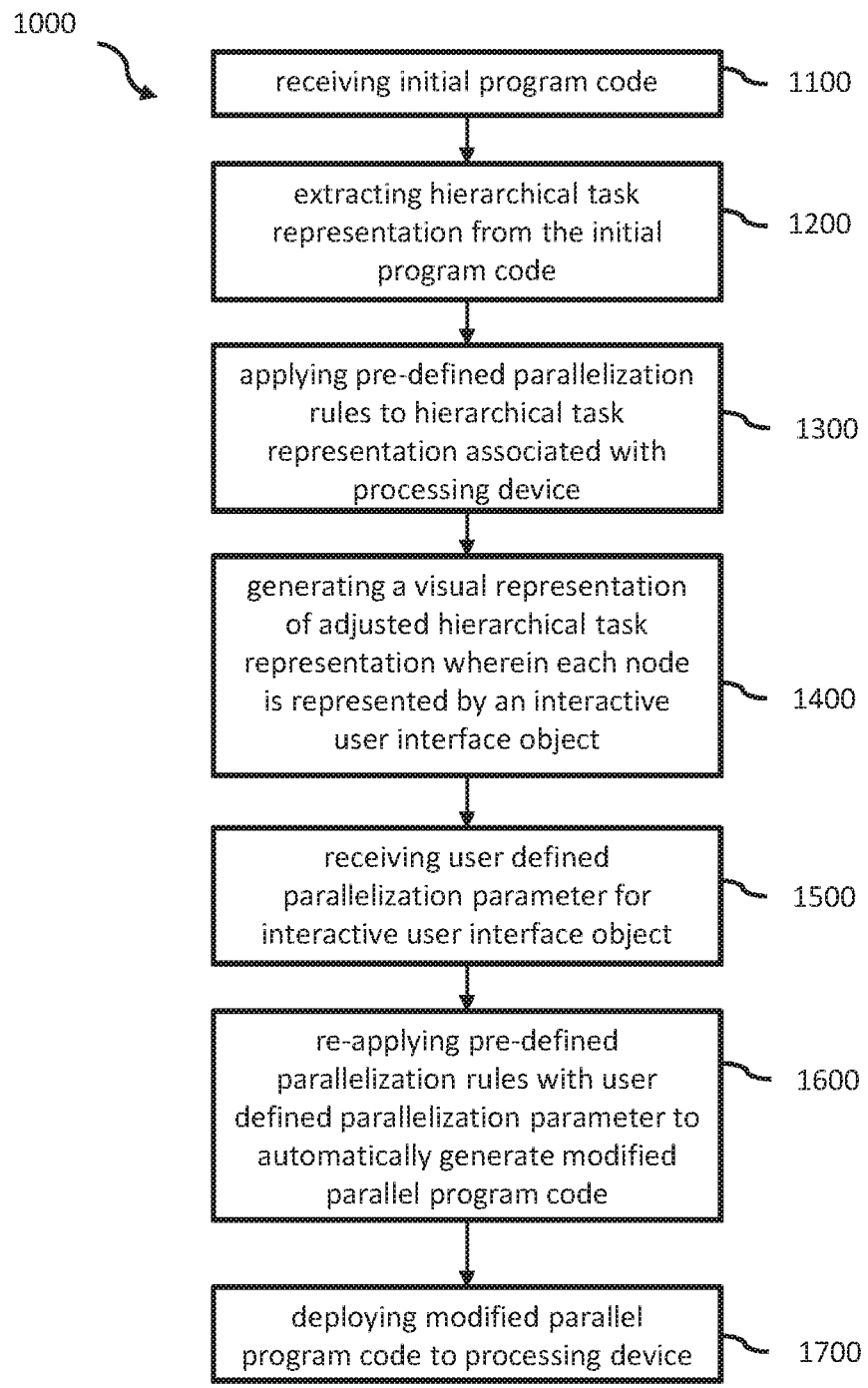
FIG. 2 is a simplified flow chart of a computer-implemented method for deploying a parallelized program to a processing device with a plurality of processing units, according to an example embodiment.

FIG. 1 is a simplified block diagram of a computer system including a compiler system 100 according to an embodiment of the invention for optimizing and deploying a program for multi-processing-unit execution. FIG. 1 will be described in the context of FIG. 2 which is a simplified flow chart of a computer-implemented method 1000 for the deployment of a parallelized program for multi-processing-unit execution according to an embodiment of the invention. Reference numbers may refer to FIG. 1 and FIG. 2.

The system 100 is communicatively coupled with a storage component 110 where program code files 111i to 111m can be stored. Any appropriate memory component can be used. For example, a file system, database or the main memory may be used to organize the various program codes in the storage component 110. For example, the storage component 110 can be an integral part of the compiler system 100. However, alternatively, the storage component can be a remote device which is communicatively coupled with the compiler system 100. For example, cloud storage devices (storage devices on remote computers) may be used.

At least one initial program code 111i which is stored in the storage component 110 implements an algorithm to be executed by one or more processing units P1 to Pn of the processing device 190. The processing device may be a remote system which is communicatively coupled with the compiler system 100. The processing device can also be a virtual system combining multiple systems, each with one or more processing units, into a single system. Any configuration of the processing device 190 may be used which allows to use the processing units P1 to Pn for executing programs whose program codes are stored in the storage component. For example, the processing device 190 can be used to perform parallel execution of a program code which is written to support parallelization. In a typical scenario the processing device 190 is part of an embedded system. An embedded system is a computer system with a dedicated function within a larger mechanical or electrical system, often with real-time computing constraints. It is embedded as part of a complete device often including hardware and mechanical parts. Embedded systems control many devices in common use today.

The compiler system 100 receives 1100 the initial program code 111i of the program from the storage component 110 via an appropriate interface. For example, the initial program code 111i can be optimized for the processing units at a later point in time or it may already be configured to be executed by at least one of the processing units P1 to Pn. For example, the program code may originally be a sequential program designed to be executed by a single processor (e.g., P1).

The compiler system 100 has an extractor module 120 configured to extract 1200 a hierarchical task representation 121 from the initial program code 111i. Once the hierarchical task representation is extracted the extractor 120 is not needed any more for the further parallelization of the initial program code. FIG. 3A illustrates details of this extraction which are preparatory steps executed before hierarchies are inserted and control and data flow is considered. Firstly, the extractor 120 generates 1210 an abstract syntax tree from the initial program code 111i. Then, it extracts 1220 a control flow graph from the abstract syntax tree and finally determines 1230 data dependencies within the control flow graph. For example, for determining data dependencies, static program analysis may be used. Static program analysis is the analysis of computer software that is performed at compile time without actually executing programs. The analysis of the program can be performed on some version of the source code or on some form of the respective object code. Available tools, such as for example LLVM (provided by The LLVM Compiler Infrastructure, available at www.llvm.org) or GCC (the GNU Compiler Collection, available at https://gcc.gnu.org/), can be used for performing the static analysis of the initial program code 111i.

As a result the hierarchical task representation 121 is generated as a tree wherein each node of the tree corresponds to a potential unit of execution. That is, each node reflects a task of the initial program code where some tasks can have sub-tasks leading to further hierarchy levels in the tree 121. The root node 121r of the hierarchical task representation 121 represents the entire initial program code 111i. Each child node 121c1 represents a sub-set of units of execution of its respective parent node 121p1. In other words, all child nodes of the parent node 121p1 represent sub-tasks of the task associated with the parent node 121p1. Also the root node is a parent node. In the example, the node 121p1 is a child node of the root node 121r. The hierarchical task representation 121 can be seen as an intermediate representation which is provided to the visualizer 130 as input for visualization as well as to the parallelizer for an initial fully automatic parallelization of the initial program code.

A parallelizer module 140 of the compiler 100 can apply 1300 predefined parallelization rules. As illustrated by dashed lines A1, the rules are associated with the processing device 190 to the hierarchical task representation 121. The predefined parallelization rules take into account the system design of the processing device regarding the available processing units and other hardware related constraints such as for example, the available memory or the clock speed. The parallelizer 140 automatically adjusts the hierarchical task representation 121 by assigning particular units of execution (task nodes) to particular processing units P1 to Pn of the processing device and further inserts communication and/or synchronization in that the adjusted hierarchical task representation reflects parallel program code for the processing device 190. This parallelization step applied to the initial program is fully automatic and can only reflect what has been designed into the predefined parallelization rules. However, this may not necessarily lead to a parallel program with optimal execution performance on the processing device 190.

The visualizer module 130 (in compiler 100) is configured to generate 1400 a visual representation 131 of the hierarchical task representation 121. The visual representation 131 allows a user to interact with the system 100. For example, a subset of nodes 121r, 121p1, 121c1 of the hierarchical task representation may be represented by respective user interface objects 131r, 131p1, 131c1 and the user interface objects are arranged according to the respective parent-child relationships of the nodes. In the example, the user interface object 131r at the lowest level corresponds to the root node 121r and, therefore, visualizes the entire program. Alternatively, the visualization may also show the root node at the top layer and arrange subordinate hierarchy layers below the top layer.

The hierarchy level above the root node level indicates that loop structures or branch statements were found in the initial program code 111i directly in the main portion of the initial program leading to three user interface objects (e.g., user interface object 131p1 corresponding to node 121p1) at this first hierarchy level. As the node 121p1 has three child nodes, a further hierarchy level is visualized above the first level which includes three further user interface objects corresponding to the child nodes of node 121p1. For example, user interface object 131c1 visualizes node 121c1. The user interface objects may have display properties which can indicate on which particular processing unit a particular unit of execution (task) is to be executed by the processing device. A task length property (or task duration property) of the user interface objects may indicate the execution time of the corresponding unit of execution on a particular processing unit of the processing device. For example, the width of the user interface object 131p1 (or any other appropriate visual attribute) may indicate that it is the longest task amongst the tasks at the first hierarchy level. The task length property of a user interface object may be determined by an optional performance evaluation module (not shown) of the compiler. For example, the performance evaluation module may use one or more of the following methods to determine the task length property: static performance analysis, dynamic performance profiling, performance measurement of the deployed program code on the computing device, worst-case execution time analysis or any combination of the previous methods.

The user interface objects may have further visual properties. For example, a user interface object may have a task identification property indicating a corresponding code position of the initial program code. This property may be acquired when parsing the initial program code with a program like Eclipse CDT—C/C++ Development Tooling. In a sample code as shown in FIG. 4, the user interface object representing the function "read_data(in)" may have the additional information "source code line 5".

The user interface objects 131 displayed by the visualizer 130 include interactive user interface objects. In some embodiments, all user interface objects may be interactive objects. An interactive user interface object is a graphical object which allows a user to interact with the compiler 100 and to provide additional parallelization constraints or parallelization input parameters. The constraints and parameters may differ from the parallelization parameters used by the parallelizer for performing the automatic parallelization. In other words, the user is prompted with the result of the automatic parallelization in the form of the visualization 131 and can now modify the configuration for the parallelization by using the interactive user interface objects (e.g., 131r, 131p1, 131c1) to change the configuration of the parallelization by providing user defined parallelization parameters PP1.

The hierarchical visualization may be complemented by a scheduling view which will be described in more detail in the context of further embodiments. Any appropriate user interaction technology, such as for example, selection from drop down list, selection from a context menu, drag and drop, etc., may be used to enable the interaction of the user with the interactive user interface object. For example, the user may click on a particular interactive user interface object with the right mouse button to receive a context menu. Other interaction modes are disclosed in the context of the examples in the following figures.

Once the compiler has received 1500 one or more user defined parallelization parameters PP1 for one or more interactive user interface objects (e.g., 131p1), the parallelizer 140 re-applies 1600 the pre-defined parallelization rules with the one or more user defined parallelization parameters PP1 and the code generator 150 automatically generates a modified parallel program code 111m for the processing device 190 adjusted to the user defined parallelization parameters PP1. In other words, the parallelizer adjusts the hierarchical task representation to reflect the automatic parallelization result with the user defined parallelization parameters and the code generator 150 generates the corresponding parallel program code 111m. Such code generators are known in the art (e.g., the Open Source GeCoS—Generic Compiler Suite). The association A1 also includes or implies predefined rules for the device specific code generation dependent on the hardware configuration of the processing device 190.

For example, the task length property of particular interactive user interface objects may indicate to the user that the respective tasks are responsible for a substantial portion of the resource consumption in the processing device 190. This may lead to an iteration of the previously disclosed steps. In other words, the visualizer 130 now presents an updated visualization 131 which now corresponds to the modified parallel program 111m. Again, the user can interact with the interactive user interface objects to provide additional parallelization parameters to the parallelizer 140. The parallelizer then re-applies the pre-defined parallelization rules to the corresponding hierarchical task representation and provides a further modified version of the modified program 111m which is adjusted to the parallelization parameters received during the iteration round. Such iterations may be continued until no further user defined parallelization parameters are received. This indicates that the resulting parallel program code is sufficiently optimized for the execution on the processing device 190.

As a result, In some embodiments, the compiler 100 deploys 1700 the generated parallel program code to the processing device 190 where it is received 2100 (cf. FIG. 3B) and executed 2200 (cf. FIG. 3B) with at least a subset of the processing units P1 to Pn.

In the following description, detailed examples with various user defined parallelization parameters are disclosed to illustrate the various functions of interactive user interface objects in the context of the described invention. However, the examples are only explanatory and not meant to limit the scope of the claims in any way. On the contrary, a person skilled in the art is able to apply the teachings of the disclosed examples to the general inventive concept as claimed in the independent claims—in particular independent of any specific programming language.

FIG. 4 is a simple C code example of an initial program code 111i which will be used for the following scenario descriptions. The main( ) procedure includes variable definitions for input (in) and output parameters (out). In a first function (read_data) the input data is read by the program, for example from an input device. In a second function (fft), a Fast Fourier Transformation is applied to the input parameters and computes the fft result as output data. In a third function (write_data), the output parameters (i.e., the fft result) are written to an output device or to a data structure for storing the fft result.

The fft sub-routine can be implemented as shown in the following code example 1. The Fourier transformation is calculated by a 256-point radix-4 Cooley-Tukey FFT algorithm. The fft function performs at first the initialization that pre-calculates the coefficients (twiddle factors). Afterwards, the Fourier transform is calculated in four rounds in a for-loop.

Code Example 1

```
void fft(out, in) {
    int i, j;
    double twiddle[128][2];
    //initialize coefficients
    for(i = 0; i < 256; i++)
        twiddle[i][0] = ...;
        twiddle[i][1] = ...;
    }
    //main loop
    for(i = 0; i < 4; i++) {
        for(j = 0; j < 256; j+=2) {
            ...
        }
    }
}
```

Figure 5A:
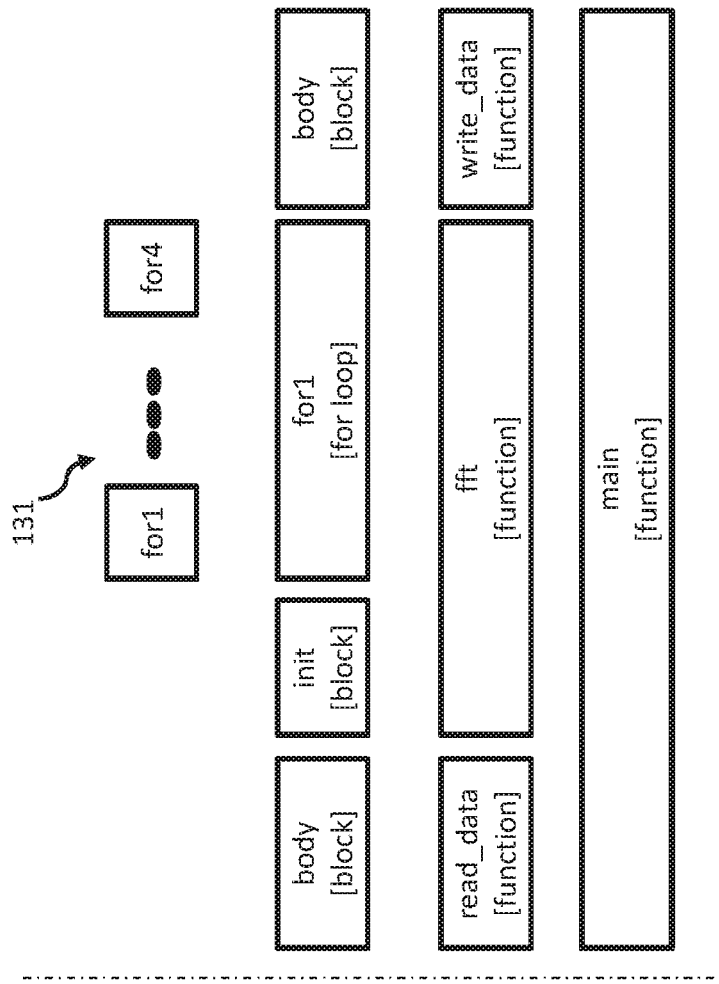
FIG. 5A illustrates an example of a hierarchical task representation and a visualization thereof.

FIG. 5A illustrates an example of a hierarchical task representation 121 and a visualization 131 for the initial main program with the above fft subroutine. The root node 1 of the hierarchical task representation 121 represents the highest level in the initial program code structure which corresponds to the entire initial program. The root node is visualized in corresponding visualization 131 as graphic user interface object main [function] at the bottom of the hierarchical visualization. In the example, the width of the user interface object reflects the time required for execution by the processing device. In the example, the overall width of MAIN (root level) reflects the overall duration of the entire program. The width of all other objects is scaled to show the principles described more clearly. Usually, the width of user interface objects reflect the relative duration of the represented object compared to the overall duration. Indicating the duration by values is also possible.

The next hierarchy level includes the nodes 2, 3, 4 which represent the procedures read_data, fft and write_data at the first subordinate hierarchy level of the initial program code. These nodes are visualized via the user interface objects read_data [function], fft [function] and write_data [function] at the hierarchy level above the main [function] object. In the example, the fft user interface object has a larger width than the other two user interface objects indicating that the execution on the processing device takes more time for the fft function than for the other sub-routines at this hierarchy level.

In the example, at the next hierarchy level the read_data [function] and write_data [function] have no further hierarchical structure but just include code blocks implementing the respective functions. Such code blocks are represented by the nodes 5 and 8 at the next hierarchy level and visualized by the corresponding user interface objects body [block]. However, the fft subroutine has a hierarchical structure. It includes a for-loop for the initialization of coefficients and a nested for-loop for the main loop to compute the transformation. Accordingly, the hierarchical task representation includes the two nodes 6, 7 as child nodes of the fft node 3. Node 6 represents the initialization block and node 7 represents the first level of the nested for-loop (main loop). The nodes 6 and 7 are visualized by the corresponding user interface objects init [block] and for1 [for loop] respectively.

Only the nested for-loop (main loop) includes an additional hierarchical structure in the form of further for-loops which are executed inside the outer for-loop. Therefore, the hierarchical task representation 121 has a further hierarchy level with the nodes 9, 10, 11, 12 representing the inner for-loops of the main loop. The inner loop nodes 9, 10, 11, 12 are therefore child nodes of the outer loop node 7. In the visualization they are illustrated at the next hierarchy level as the for-loops for1 to for4.

As a result, the visualization 131 reflects the hierarchical structure of the hierarchical task representation 121 which corresponds to the hierarchical structure of the initial program code 111i including its subroutines. In some embodiments, the visualizer 130 may be configured with a threshold value for hierarchy levels. The threshold value determines that once the number of visualized hierarchy values reaches the threshold value no further hierarchy levels can be added to the visualization 131

Figure 5B:
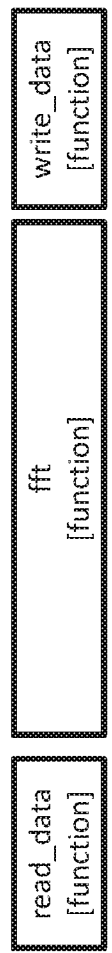
FIG. 5B illustrates an example of an assignment of program portions to processing units.

FIG. 5B illustrates an example of an assignment of program portions to processing units P1, P2 of the processing device in a scheduling view. The scheduling view can complement the hierarchical visualization 131 of FIG. 5A and shows in which order and in which time the program steps are to be executed by a respective processing unit. The user interface objects in the scheduling view may represent such program portions which can be directly assigned to one of the processing units of the processing device. Such user interface objects may also be interactive user interface objects. In the example, the automatic parallelization applied by the parallelizer to the hierarchical task representation 121 reflecting the initial program code 111i does not find any independent task (units of execution) inside the program. Therefore, all tasks are assigned to processing unit P1 as assigning any parts to processing unit P2 would lead to an avoidable communication between the processing units. Processing unit P2 stays idle. At this point the automatic parallelization capability of the parallelizer has reached its limit. In a fully automated parallelization approach the compiler system would now deploy the initial program code which could not be parallelized to the processing device and the processing device could not take any benefit from its multi-processing unit capability when executing the received program.

Figure 6A:
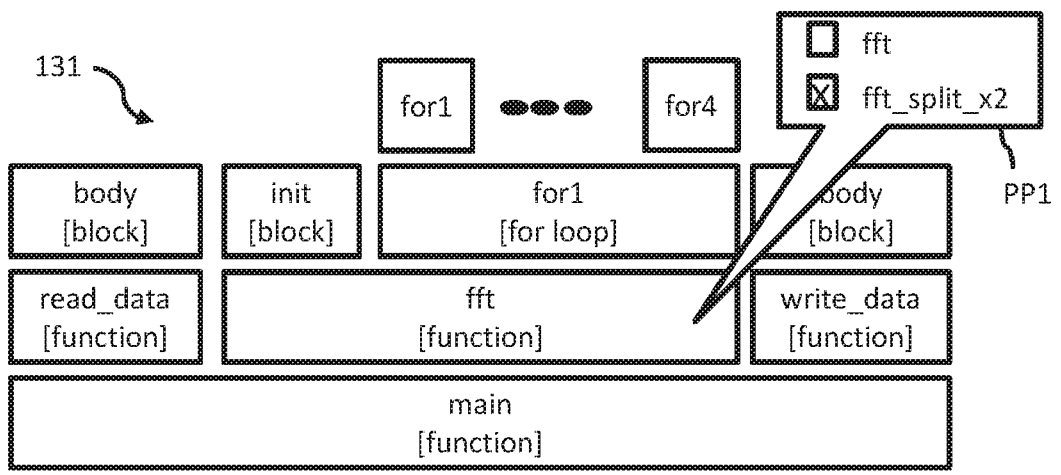
FIG. 6A illustrates re-application of pre-defined parallelization rules in response to user defined parallelization parameter input.
Figure 6A:
Figure 6A:
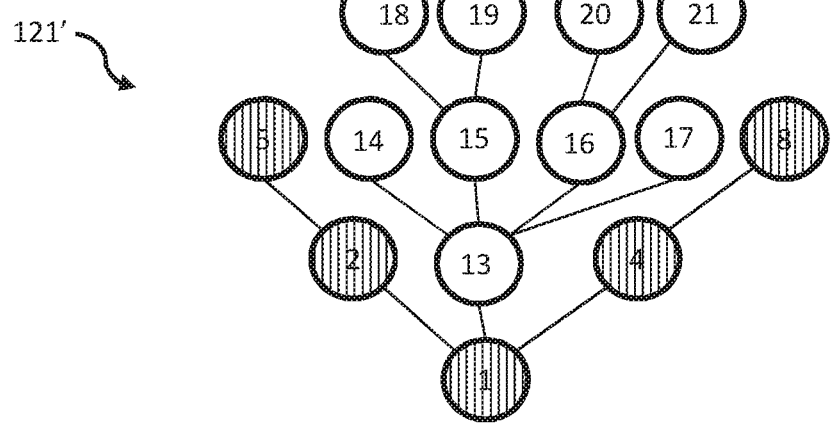
Figure 6A:
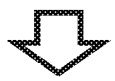
Figure 6A:
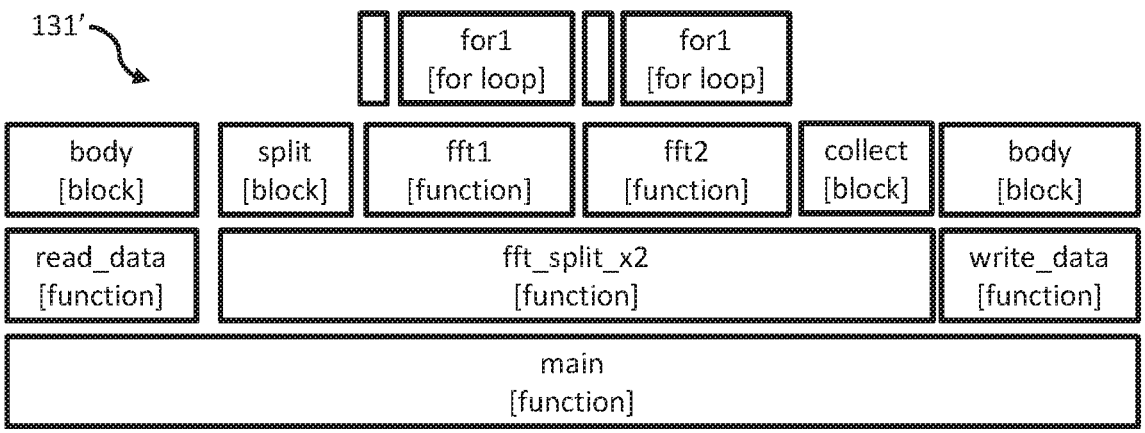

FIG. 6A illustrates the re-application of pre-defined parallelization rules in response to user defined parallelization parameter input according to an embodiment of the invention. In this embodiment, at least some of the user interface objects in the visualization 131 of the hierarchical task representation are configured as interactive user interface objects. For example, the fft [function] object at the hierarchy level above the main [function] object is an interactive user interface object. A user looking at the result of the fully automatic parallelization attempt in FIGS. 5A, 5B may recognize that for certain portions of the initial program parallelization would be advantageous because of their significant contribution to the total execution time interval of the program. In the example, the fft [function] object represents the part of the program with the highest contribution. When the user interacts with this interactive user object the user is prompted with alternative algorithms/implementations available to perform the desired Fast Fourier Transformation. Besides the currently used fft an alternative algorithm fft_split_x2 is provided as an option. The fft_split_x2 option calculates the 256 point Fourier transform by two independent fft function calls of 128 points. The overhead of this approach is that the input data can be split and prepared for the two fft function calls as well as that the output data is collected. The user may select the alternative fft_split_x2 algorithm as parallelization parameter input PP1. It does not require any technical reasoning by the user to do so. The user may simply try another option for a part of the program which seems to make a substantial contribution to the overall program execution time interval.

The implementation of the alternative fft_split_x2 subroutine is shown in the following code example 2.

Code Example 2

```
void fft_split_x2(double out[256][2], double in[256][2]) {
    double in1[128][2];
    double in2[128][2];
    double out1[128][2];
    double out2[128][2];
    //split the input
    split(in1, in2, in);
    fft(out1, in1);
    fft(out2, in2);
    //collect the results
    collect(out, out1, out2);
}
```

The extractor now extracts an adjusted hierarchical task representation 121' from the modified program code with the alternative Fast Fourier Transformation implementation. In FIG. 6A the grey shaded nodes 1, 2, 4, 5, 8 remain unaffected by the changes compared with the previous version of hierarchical task representation. However, the previous fft node 3 is now replaced by the fft_split_x2 node 13 (visualized by the user interface object fft_split_x2 [function]) which has a different structure and, therefore, has different child nodes 14, 15, 16, 17 (visualized by the user interface objects split [block], fft1 [function], fft2 [function], collect [block], respectively). In the example, the fft1 and fft2 function nodes 15, 16 have the same structure as the fft function in FIG. 5A with two child nodes 18, 19 and 20, 21, respectively. These child nodes are visualized by the corresponding user interface objects at the upper hierarchy level of the corresponding visualization 131' (at the bottom part of FIG. 6A).

Figure 6B:
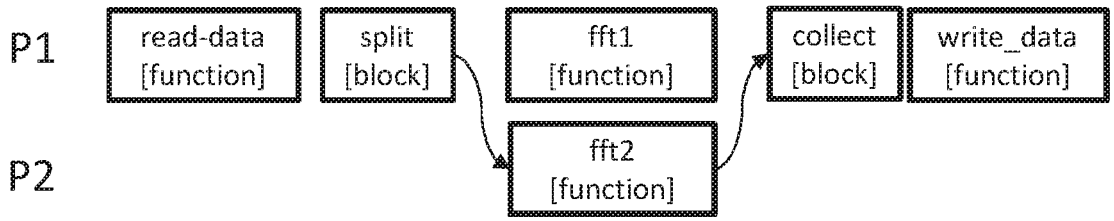
FIG. 6B illustrates an example of an assignment of program portions to processing units.

When re-applying the predefined parallelization rules to the adjusted hierarchical task representation 121' for performing the automatic parallelization the parellelizer detects that fft1 and fft2 are independent of each other and schedules them in parallel. FIG. 6B shows the scheduling result where fft1 is executed by processing unit P1 and fft2 is executed in parallel by processing unit P2. The necessary communications between split [block] and fft2 [function] as well as between fft2 [function] and collect [block] are inserted automatically by the parallelizer and visualized accordingly. In the example, bended arrows are used to indicate communications. As a result, the overall execution time for the parallel program is now reduced when compared to the execution time for the initial sequential program. In particular, the original fft [function] with the highest contribution to the overall program execution time is now parallelized which reduces the overall execution time. Thereby, the overall execution time of the entire program is reduced by the parallelization of an alternative algorithm replacing the initially non parallelizable Fast Fourier Transformation portion of the initial program code.

Figure 7B:
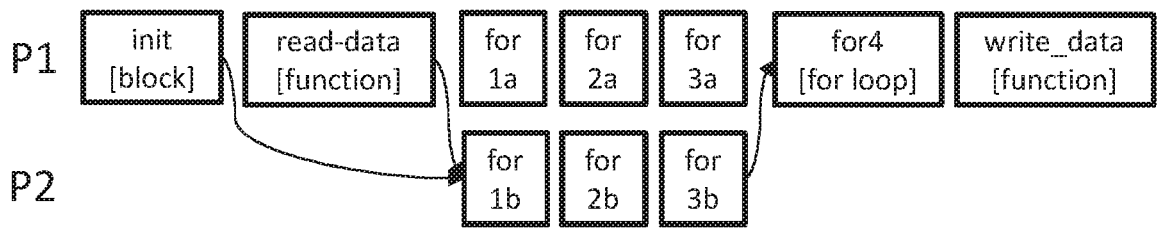
FIGS. 7A to 7E illustrate further examples of re-application of pre-defined parallelization rules in response to user defined parallelization parameter input and resulting assignments of program portions to processing units.
Figure 7C:
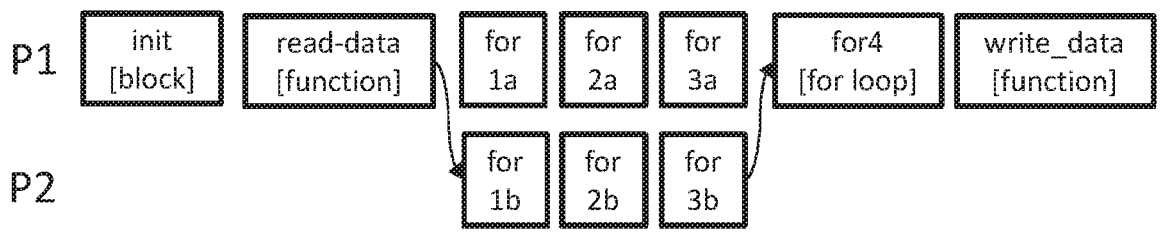
Figure 7D:
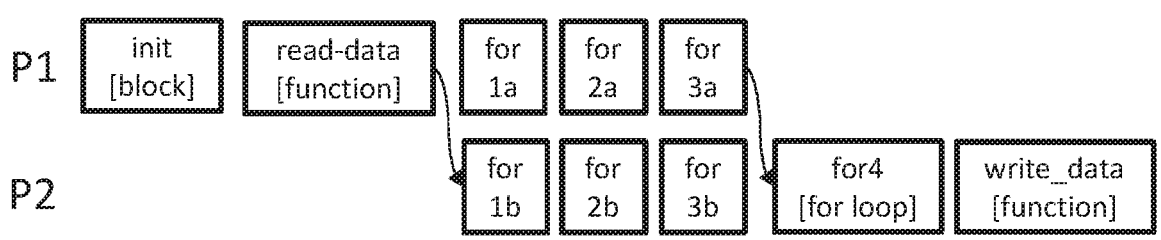
Figure 7A:
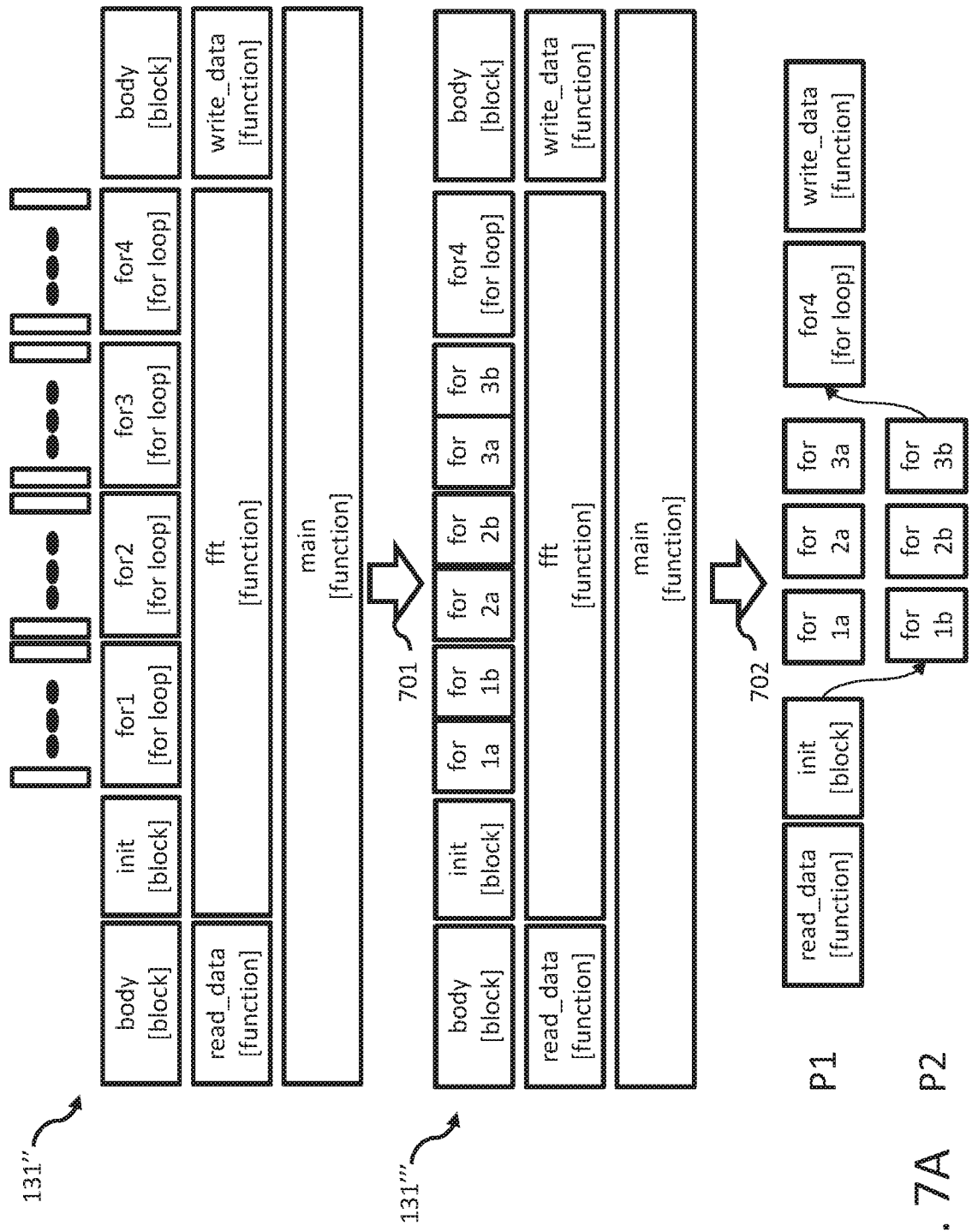

FIG. 7A illustrates another option for assisting the automatic parallelization process of the initial program code. In the example of FIG. 7A only the visualization of hierarchical task representation and the corresponding schedule is shown. The person skilled in the art can derive the corresponding tree structures of the respective hierarchical task representations. For example, the user may interact with the interactive for1 [for loop] user interface object (cf. FIG. 5A) to trigger the creation of more independent tasks inside the Fast Fourier Transformation for enabling parallelization. For example, two code transformations may be applied to achieve this and the transformations can be selected as user defined parallelization parameters. The code transformation may be performed by the parallelizer or, optionally, by a dedicated transformation module. In a first transformation the for1 loop of FIG. 5A has four iterations and is unrolled. Each iteration contains a for-loop, resulting in four new nodes for1, for2, for3, for4 with the respective user interface objects for1 [for loop], for2 [for loop], for3 [for loop], for4 [for loop]. The visualization 131″ in the upper part of FIG. 7A corresponds to the result of this first code transformation of the initial program code with four new for-loops at the third hierarchy level. The following code example 3 illustrates the result of this transformation at code level.

Code Example 3

```
//first transformation
void fft(out, in) {
    int i, j;
    //initialize coefficients
    for(i = 0; i < 256; i++)
        twiddle[i][0] = ...;
        twiddle[i][1] = ...;
    }
    //for1
    for(j = 0; j < 256; j+=2) {
        ...
    }
    //for2
    for(j = 0; j < 256; j+=2) {
        ...
    }
    //for3
    for(j = 0; j < 256; j+=2) {
        ...
    }
    //for4
    for(j = 0; j < 256; j+=2) {
        ...
    }
}
```

A second code transformation 701, as illustrated by the following code example 4, can then be selected as user defined parallelization parameter to apply loop splitting to the for1, for2 and for3 loops. The application of the second transformation 701 leads to the visual representation 131‴ where each of said loops is now split into two for-loops (for1a, for1b, for2a, for2b, for3a, for3b).

Code Example 4

```
//second transformation
void fft(out, in) {
    int i, j1, j2;
    //initialize coefficients
    for(i = 0; i < 256; i++)
        twiddle[i][0] = ...;
        twiddle[i][1] = ...;
    }
    //for1a
```

```
            for(j1 = 0; j1 < 128; j1++) {
                ...
            }
            //for1b
            for(j2 = 128; j2 < 256; j2++) {
                ...
            }
            //for2a
            for(j1 = 0; j1 < 128; j1++) {
                ...
            }
            //for2b
            for(j2 = 128; j2 < 256; j2++) {
                ...
            }
            //for3a
            for(j1 = 0; j1 < 128; j1++) {
                ...
            }
            //for3b
            for(j2 = 128; j2 < 256; j2++) {
                ...
            }
            //for4
            for(j1 = 0; j1 < 256; j1++) {
                ...
            }
        }
```

That is, the visualization 131''' shows the status of the parallelization after two code transformation steps with three pairs of for-loops. However, loop for4 [for loop] cannot be split due to data dependencies and, therefore, remains as a monolithic block. The automatic parallelization 702 performed by the parallelizer detects that for1*a* and for1*b*, for2*a* and for2*b*, and for3*a* and for3*b* are independent of each other and schedules them in parallel on the processing units P1 and P2. The corresponding scheduling result is shown in the scheduling view beneath the arrow 702. Communications between the init [block] and for1*b* as well as between for3*b* and for4 [for loop] are inserted automatically by the parallelizer. In the example, communications are again visualized as bended arrows between the corresponding user interface objects in the scheduling view. Again, as a result, the overall execution time of the entire program is reduced through the parallelization achieved by using code transformations as user defined parallelization parameters. This may be visualized by adjusting the width of the user interface object at the root level accordingly. It is hardly possible for the automatic parallelizer to automatically identify the above opportunities for code transformation to optimize the parallel program with regards to the execution performance on the processing device because the solution space including all potential parallelization parameters is too large to come to an acceptable parallelization result within an acceptable time interval. For that reason, it is desirable to allow user interaction with the compiler system to assist the automatic parallelization through user defined parallelization parameters in multiple iterative steps. Relatively simple predefined parallelization rules associated with a relatively small solution space can then be iteratively applied leading to a near-optimal execution performance on the processing device.

FIG. 7B illustrates a further option to optimize the parallel program code via the interactive user interface objects of the scheduling view. For example, the order of init [block] and read_data [function] can be exchanged. As a result, a new communication is inserted between init [block] and loop for1*b*. For example, the user may drag and drop the init block from the right of the read-data [function] object to its left and thereby set a user defined parallelization parameter affecting directly the scheduling of a particular task object (e.g. init) for a particular processing unit (e.g., P1). Any other user interaction supported by the interactive user objects to achieve the rescheduling may be used instead (e.g., maintaining a list with the order of execution of the program portions, adding an execution position number of a program portion to the respective user interface object, etc.) A user may have more information about the program than what is codified in the predefined parallelization rules determining the result of the automatic parallelization process. For example, a second optimization criterion besides the overall execution time of the program is the delay between read_data and write_data. Since the init block is independent of the data provided by the read_data function, the order for init and read_data can be exchanged. In doing so, the delay or reaction time between read_data and write_data is reduced beyond what can be achieved by the fully automatic parallelization process. The following code example 5 shows how the parallel program code of the main procedure is adjusted by the parallelizer in response to the user defined parallelization parameter input regarding the scheduling change of the init block.

Code Example 5

```
int main( ) {
    int i;
    double in[256][2];
    double out[256][2];
    double twiddle[256][2];
    //initialize coefficients
    for(i = 0; i < 256; i++) {
        twiddle[i][0] = ...;
        twiddle[i][1] = ...;
    }
    read_data(in);
    fft_without_init(out, in, twiddle);
    write_data(out);
}
```

FIG. 7C illustrates a further option to optimize the parallel program code via the interactive user interface objects of the scheduling view. In the previous example of FIG. 7B a new communication is inserted by the parallelizer between the init block and the for1*b* loop. However, in order to reduce the network load, it may be more efficient to group multiple communications at the same time. The user can constrain the time of communication for optimizing the program via providing the grouping of init [block] and read-data [function] as a user defined parallelization parameter. Grouping of interactive user interface objects may be achieved by standard user interaction patterns such as for example: multi-selection of the objects by using SHIFT+mouse click, multi-selection of the objects by spanning a section area around the objects using a mouse device, multi-selection of the objects by using a touchscreen with multi-touch capability, etc. With this constraint the subsequent re-application of the parallelization rules leads to the communication between init and for1*b* being performed after read_data [function].

FIG. 7D illustrates a further option to optimize the parallel program code via the interactive user interface objects. Although FIG. 7D illustrates an example of the scheduling view, the skilled person will recognize that the same optimization can be achieved by using the hierarchical task view where interactive user interface objects have the respective properties (e.g. task length property, processing unit assignment property, etc.). In the previous example of FIG. 7C, the user interface object write_data [function] (and the respective node in the hierarchical task representation) is automatically assigned to processing unit P1. In a particular scenario processing unit P2 may have faster access to the external interface. In this case, the parallel program can be further optimized by assigning write_data to processing unit P2. In this embodiment, the user provides an assignment of a particular user interface (e.g., task) object to a particular processing unit as a user defined parallelization parameter. Through this input, write_data [function] is manually assigned to processing unit P2. In order to minimize communication, the automatic parallelization process assigns the for4 [for loop] to processing unit P2, too, in accordance with the predefined parallelization rules which are reapplied by the parallelizer to the hierarchical task representation after the receipt of the user defined parallelization parameter (manual assignment to processing unit).

Figure 7E:
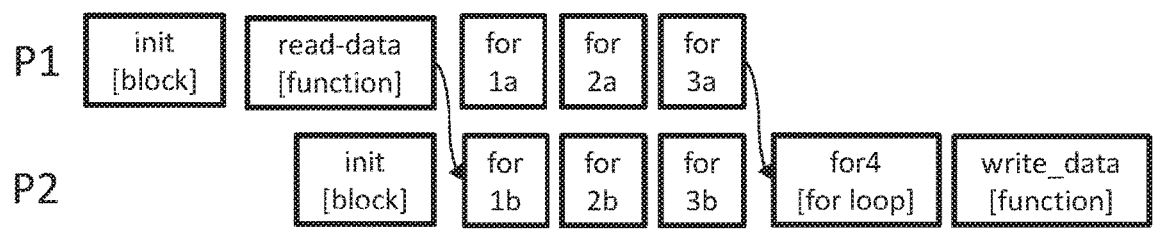

FIG. 7E illustrates a further option to optimize the parallel program code via the interactive user interface objects. The init [block] can be marked for duplication so that a copy of it will be executed on P2. In doing so, the amount of data that is sent from P1 to P2 is reduced as only the data that was read by the read_data [function] has to be sent, thus leading to a faster execution of the whole program.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a compiler system for optimizing a program for execution by a processing device having a plurality of processing units including: an extractor module configured to extract, from an initial program code a hierarchical task representation, each node of the hierarchical task representation corresponding to a potential unit of execution, where a root node of the hierarchical task representation represents the initial program code and each child node represents a sub-set of units of execution of its respective parent node; a parallelizer module configured to apply to the hierarchical task representation a plurality of pre-defined parallelization rules associated with the processing device to automatically adjust the hierarchical task representation by assigning units of execution to one or more processing units of the processing device and by inserting communication tasks or synchronization tasks such that the adjusted hierarchical task representation reflects parallel program code for communicating or synchronizing between two or more of the processing units corresponding to the processing device, and further configured to re-apply the plurality of pre-defined parallelization rules with one or more user defined parallelization parameters; a code generator module configured to automatically generate, based on the adjusted hierarchical task representation, a modified parallel program code for the processing device adjusted to the user defined parallelization parameters; and a visualizer module) configured to generate a visual representation of the hierarchical task representation, where user interface objects represent respective nodes of at least a subset of nodes and the user interface objects are arranged according to the respective parent-child relationships, and further configured to receive, for one or more interactive user interface objects, the one or more user defined parallelization parameters, where at least one interactive user interface object has a task length property representing an execution time interval of the corresponding unit of execution on a particular processing unit of the processing device. Other embodiments of this aspect include corresponding computer systems, apparatus, and computer programs recorded on one or more computer storage devices, each configured to perform the actions of the methods.

One general aspect includes a computer-implemented method for deploying a parallelized program to a processing device with a plurality of processing units, including: receiving an initial program code, the initial program code implementing an algorithm where the algorithm is to be executed by the processing device (190); extracting, from the initial program code, a hierarchical task representation where each node of the hierarchical task representation corresponds to a potential unit of execution, where a root node of the hierarchical task representation represents the initial program code and each child node represents a sub-set of units of execution of its respective parent node; applying to the hierarchical task representation a plurality of pre-defined parallelization rules associated with the processing device to automatically adjust the hierarchical task representation by assigning units of execution to one or more processing units of the processing device and by inserting communication tasks or synchronization tasks such that the adjusted hierarchical task representation reflects parallel program code for communicating or synchronizing between two or more of the processing units corresponding to the processing device; generating a visual representation of the adjusted hierarchical task representation, where each node of at least a subset of nodes is represented by a user interface object and the user interface objects are arranged according to the respective parent-child relationships; receiving, for one or more interactive user interface objects, one or more user defined parallelization parameters modifying the arrangement of the interactive user interface objects of a scheduling view, where at least one interactive user interface object has a task length property representing an execution time interval of the corresponding unit of execution on a particular processing unit of the processing device; re-applying the pre-defined parallelization rules with the one or more user defined parallelization parameters to automatically generate a modified parallel program code for the processing device adjusted to the user defined parallelization parameters; and deploying the modified parallel program code to the processing device. Other embodiments of this aspect include corresponding computer systems, apparatus, and computer programs recorded on one or more computer storage devices, each configured to perform the actions of the methods.

Figure 8:
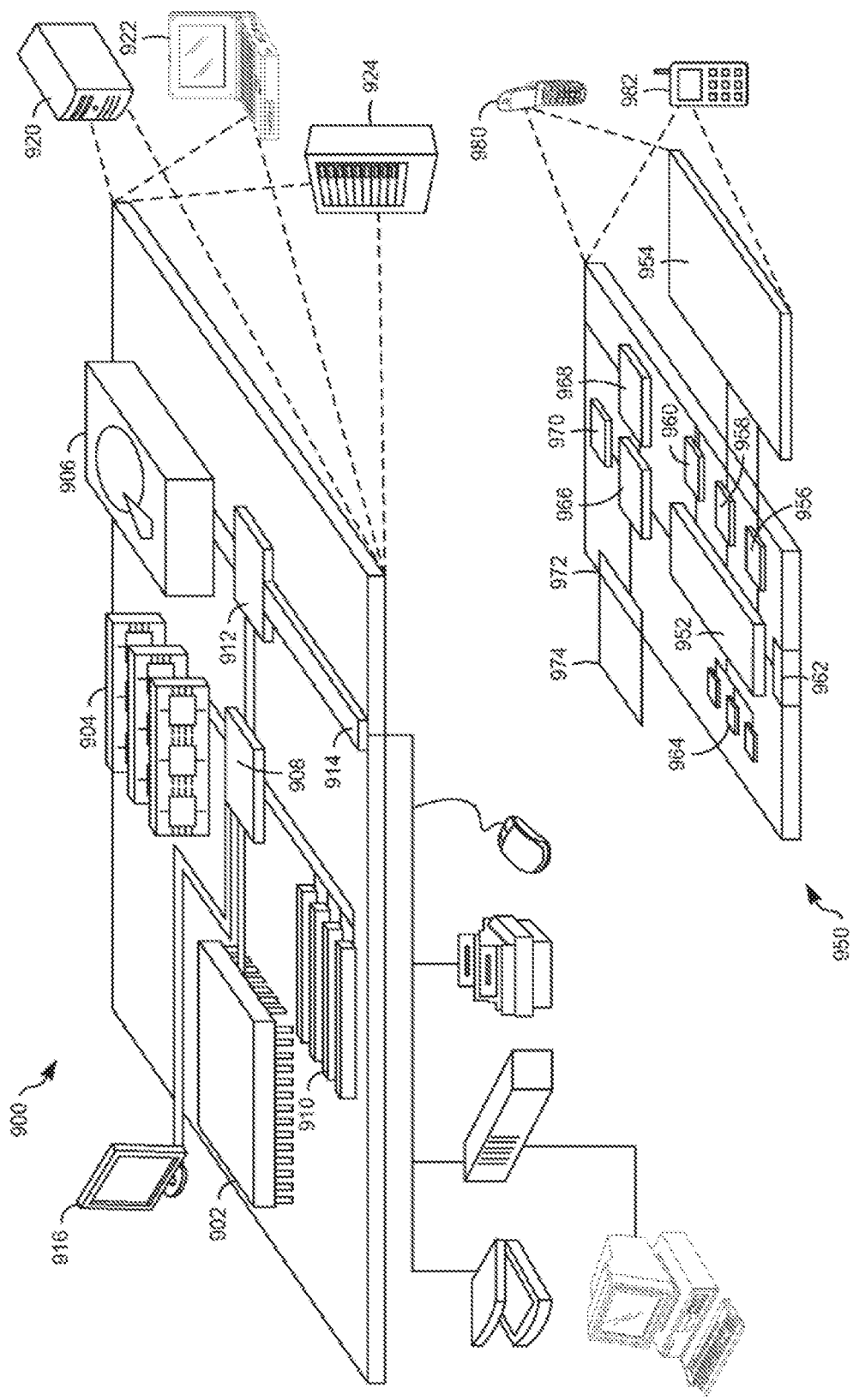
FIG. 8 is a diagram that shows an example of a computer device and a mobile computer device, which may be used with the techniques described here.

FIG. 8 is a diagram that shows an example of a computer device 900 and a mobile computer device 950, which may be used with the techniques described here. Computing device 900 is intended to represent various forms of digital computers, such as laptops, desktops, workstations, personal digital assistants, servers, blade servers, mainframes, and other appropriate computers. Computer device may 900 correspond to the computer system 100 of FIG. 1. Computing device 950 is intended to represent various forms of mobile devices, such as personal digital assistants, cellular telephones, smart phones, and other similar computing devices. For example, computing device 950 may include the data storage components and/or processing components of agent devices as shown in FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A compiler system for optimizing, at compile time, a program for execution by a processing device having a plurality of processing units, the compiler system comprising:
    an extractor module configured to extract, from an initial program code, a hierarchical task representation, each node of the hierarchical task representation corresponding to a potential unit of execution, wherein a root node of the hierarchical task representation represents the initial program code and each child node represents a sub-set of units of execution of its respective parent node;
    a parallelizer module configured to apply to the hierarchical task representation a plurality of pre-defined parallelization rules associated with the processing device to automatically adjust the hierarchical task representation by assigning units of execution to one or more processing units of the processing device and by inserting communication tasks or synchronization tasks such that the adjusted hierarchical task representation reflects parallel program code for communicating or synchronizing between two or more of the processing units corresponding to the processing device, and further configured to re-apply the plurality of pre-defined parallelization rules with one or more user defined parallelization parameters;
    a code generator module configured to automatically generate, based on the adjusted hierarchical task representation, a modified parallel program code for the processing device adjusted to the user defined parallelization parameters;

a visualizer module configured to generate a visual representation of the hierarchical task representation, wherein user interface objects represent respective nodes of at least a subset of nodes and the user interface objects are arranged according to the respective parent-child relationships, and further configured to receive, for one or more interactive user interface objects, the one or more user defined parallelization parameters, wherein a plurality of interactive user interface objects have task length properties representing an execution time interval of the corresponding units of execution on a particular processing unit of the processing device; and an interface configured to deploy the modified parallel program code to the processing device.

2. The system of claim 1, wherein the one or more user defined parallelization parameters include a selection of at least one algorithm for generating a task object, a selection of a transformation for a task object, restricting an assignment of a task object to one or more particular processing units or for code duplication, scheduling of a first task object before or after a second task object, and input about when a first processing unit communicates or synchronizes with a second processing unit, wherein each task object represents predefined executable functions implemented by at least one of the plurality of processing units.

3. The system of claim 1, wherein the plurality of interactive user interface objects have a processing unit assignment property indicating a particular processing unit on which the corresponding unit of execution is to be executed by the processing device.

4. The system of claim 1, wherein a node of the hierarchical task representation corresponds to a loop structure, a function, a compound statement, or a branch statement in the initial program code.

5. A computer-implemented method for deploying a compile-time optimized parallelized program to a processing device with a plurality of processing units, the method comprising:

receiving an initial program code, the initial program code implementing an algorithm wherein the algorithm is to be executed by the processing device;

extracting, from the initial program code, a hierarchical task representation wherein each node of the hierarchical task representation corresponds to a potential unit of execution, wherein a root node of the hierarchical task representation represents the initial program code and each child node represents a sub-set of units of execution of its respective parent node;

applying to the hierarchical task representation a plurality of pre-defined parallelization rules associated with the processing device to automatically adjust the hierarchical task representation by assigning units of execution to one or more processing units of the processing device and by inserting communication tasks or synchronization tasks such that the adjusted hierarchical task representation reflects parallel program code for communicating or synchronizing between two or more of the processing units corresponding to the processing device;

generating a visual representation of the adjusted hierarchical task representation, wherein each node of at least a subset of nodes is represented by a user interface object and the user interface objects are arranged according to the respective parent-child relationships;

receiving, for one or more interactive user interface objects, one or more user defined parallelization parameters modifying the arrangement of the interactive user interface objects of a scheduling view, wherein a plurality of interactive user interface objects have task length properties representing an execution time interval of the corresponding units of execution on a particular processing unit of the processing device;

re-applying the pre-defined parallelization rules with the one or more user defined parallelization parameters to automatically generate a modified parallel program code for the processing device adjusted to the user defined parallelization parameters; and deploying the modified parallel program code to the processing device.

6. The method of claim 5, wherein the initial program code is a sequential program code.

7. The method of claim 5, wherein the one or more user defined parallelization parameters include a selection of at least one algorithm for generating a task object, a selection of a transformation for a task object, restricting an assignment of a task object to one or more particular processing units or for code duplication, scheduling of a first task object before or after a second task object, and input about when a first processing unit communicates or synchronizes with a second processing unit, wherein each task object represents predefined executable functions implemented by at least one of the plurality of processing units.

8. The method of claim 5, wherein a node of the hierarchical task representation corresponds to a loop structure, a function, a compound statement, or a branch statement in the initial program code.

9. The method of claim 5, wherein the visual representation of the adjusted hierarchical task representation includes a scheduling view with a subset of user interface objects which are assigned to the processing units on which corresponding program portions are to be executed, and wherein the subset of user interface objects is arranged according to their sequence of execution on the respective processing units.

10. The method of claim 5, wherein extracting the hierarchical task representation comprises:
generating an abstract syntax tree;
extracting a control flow graph from the abstract syntax tree; and
determining data dependencies within the control flow graph.

11. The method of claim 5, wherein the plurality of interactive user interface objects have a processing unit assignment property indicating at least one processing unit on which the corresponding unit of execution is to be executed by the processing device.

12. The method of claim 5, wherein the steps generating a visual representation, receiving one or more user defined parallelization parameters, and re-applying the pre-defined parallelization rules are iteratively repeated until no further user defined parallelization parameters are received.

13. The method of claim 5, wherein, in response to the modification of the arrangement of the interactive user interface objects of a scheduling view, affected communications and synchronizations are updated accordingly.

14. A computer program product comprising instructions that when loaded into a memory of a computing device and executed by at least one processor of the computing device cause the computing device to carry out optimizing operations, at compile time, the optimizing operations including:

receiving an initial program code, the initial program code implementing an algorithm wherein the algorithm is to be executed by the processing device;

extracting, from the initial program code, a hierarchical task representation wherein each node of the hierarchical task representation corresponds to a potential unit of execution, wherein the root node of the hierarchical task representation represents the initial program code and each child node represents a sub-set of units of execution of its respective parent node;

applying, to the hierarchical task representation a plurality of pre-defined parallelization rules associated with the processing device to automatically adjust the hierarchical task representation by assigning units of execution to one or more processing units of the processing device and by inserting communication tasks or synchronization tasks such that the adjusted hierarchical task representation reflects parallel program code for communicating or synchronizing between two or more of the processing units corresponding to the processing device;

generating a visual representation of the adjusted hierarchical task representation, wherein each node of at least a subset of nodes is represented by a user interface object and the user interface objects are arranged according to the respective parent-child relationships;

receiving, for one or more interactive user interface objects, one or more user defined parallelization parameters modifying the arrangement of the interactive user interface objects of the scheduling view, wherein a plurality of interactive user interface objects have task length properties representing an execution time interval of the corresponding units of execution on a particular processing unit of the processing device;

re-applying the pre-defined parallelization rules with the one or more user defined parallelization parameters to automatically generate a modified parallel program code for the processing device adjusted to the user defined parallelization parameters; and deploying the modified parallel program code to the processing device.

15. The computer program product of claim 14, wherein the one or more user defined parallelization parameters include a selection of at least one algorithm for generating a task object, a selection of a transformation for a task object, restricting an assignment of a task object to one or more particular processing units or for code duplication, scheduling of a first task object before or after a second task object, and input about when a first processing unit communicates or synchronizes with a second processing unit, wherein each task object represents predefined executable functions implemented by at least one of the plurality of processing units.

16. The computer program product of claim 14, wherein a node of the hierarchical task representation corresponds to a loop structure, a function, a compound statement, or a branch statement in the initial program code.

17. The computer program product of claim 14 wherein extracting the hierarchical task representation comprises:
generating an abstract syntax tree;
extracting a control flow graph from the abstract syntax tree; and
determining data dependencies within the control flow graph.

18. The computer program product of claim 14, wherein the interactive user interface objects have a processing unit assignment property indicating at least one processing unit on which the corresponding unit of execution is to be executed by the processing device.

19. The computer program product of claim 14, wherein the steps generating a visual representation, receiving one or more user defined parallelization parameters, and re-applying the pre-defined parallelization rules are iteratively repeated until no further user defined parallelization parameters are received.

* * * * *